(12) United States Patent
Chandra et al.

(10) Patent No.: US 7,702,768 B2
(45) Date of Patent: Apr. 20, 2010

(54) XNM—AN INTERFACE FOR A NETWORK MANAGEMENT SYSTEM

(75) Inventors: Prakash Chandra, Union City, CA (US); Ajit Parthan, Sunnyvale, CA (US)

(73) Assignee: Network Equipment Technologies, Inc., Fremont, CA (US)

( * ) Notice: Subject to any disclaimer, the term of this patent is extended or adjusted under 35 U.S.C. 154(b) by 1511 days.

(21) Appl. No.: 11/002,475

(22) Filed: Dec. 1, 2004

(65) Prior Publication Data
US 2006/0116980 A1 Jun. 1, 2006

(51) Int. Cl.
*G06F 15/16* (2006.01)
(52) U.S. Cl. ............... 709/223; 709/203; 709/220; 709/224; 709/226; 370/252; 370/253; 370/254
(58) Field of Classification Search ............... 709/203, 709/220, 223, 224, 226; 370/252, 253, 254
See application file for complete search history.

(56) References Cited

U.S. PATENT DOCUMENTS

| | | | | |
|---|---|---|---|---|
| 7,076,523 B2 * | 7/2006 | Schneider et al. | ........... | 709/203 |
| 7,512,674 B1 * | 3/2009 | Jain et al. | ................... | 709/223 |
| 2002/0169858 A1 * | 11/2002 | Bellinger et al. | ............ | 709/220 |
| 2005/0015491 A1 * | 1/2005 | Koeppel | ..................... | 709/226 |

* cited by examiner

*Primary Examiner*—Jinsong Hu
(74) *Attorney, Agent, or Firm*—Townsend and Townsend and Crew

(57) ABSTRACT

A method for executing commands in a telecommunications system including one or more service modules is provided. The method comprises: providing an interface configured to receive commands for services from a client, the interface configured to process commands in a generic syntax; receiving a command specifying a service from the client at the interface, the command in a first language and following the generic syntax understandable by the interface; parsing the command to determine the service; determining if the service is supported by a service module in the one or more modules; and if the service is supported, sending a command for the service in a second language to the service module.

26 Claims, 4 Drawing Sheets

XNM—AN INTERFACE FOR A NETWORK MANAGEMENT SYSTEM

COPYRIGHT

A portion of the disclosure of this patent document contains material, which is subject to copyright protection. The copyright owner has no objection to the xerographic reproduction by anyone of the patent document or the patent disclosure in exactly the form it appears in the U.S. Patent and Trademark Office patent file or records, but otherwise reserves all copyright rights whatsoever.

BACKGROUND OF THE INVENTION

The present invention generally relates to telecommunications and more specifically to an interface that allows a client to communicate with a telecommunications device.

A telecommunications system is configured to perform services based on requests from a client. Typically, the telecommunications system requires that a command sent from a client be sent in a specialized language specific to the telecommunications system. This language is typically not widely known and sometimes complicated and hard to understand. Thus, users with specialized knowledge of the language are required in order to communicate and request services to be performed on the telecommunications system.

In order to communicate with the telecommunications system, specialized interfaces configured to send commands to the telecommunications systems are required at a client requesting the service. These interfaces include libraries that are installed at the client side. Libraries are a collection of pre-compiled, reusable programming routines that a user can call when creating commands for the telecommunications system. These libraries are needed in order for the client to have commands executed by the telecommunications system.

The above system includes many disadvantages. For example, if the services provided by the telecommunications system are changed, then the libraries at the client side also need to be changed. For example, if a new service is added to the telecommunications system, a new routine needs to be added at the client side library in order for the client to be able to request that service. Thus, as services are changed or added in telecommunication systems, corresponding changes to the routines in all client side libraries also need to be changed. Accordingly, each client that is communicating with the telecommunications system needs to have their libraries changed when services are changed or added. This may be very time consuming and inconvenient.

BRIEF SUMMARY OF THE INVENTION

The present invention generally relates to an interface for a telecommunications system.

In one embodiment, a method for executing commands in a telecommunications system including one or more service modules is provided. The method comprises: providing an interface configured to receive commands for services from a client, the interface configured to process commands in a generic syntax; receiving a command specifying a service from the client at the interface, the command in a first language and following the generic syntax understandable by the interface; parsing the command to determine the service; determining if the service is supported by a service module in the one or more modules; and if the service is supported, sending a command for the service in a second language to the service module.

In another embodiment, a method for processing commands in a telecommunications system including one or more service modules is provided. The method comprises: providing a mapping file including descriptors for services offered in the one or more service modules; receiving a command for a service in a first language, the command using the descriptors for the service found in the mapping file; parsing the command to determine the descriptors; determining, when the command is received, if the service is supported by the one or more service modules; and if the service is supported, generating a command in a second language for the service using the descriptors.

A further understanding of the nature and the advantages of the inventions disclosed herein may be realized by reference of the remaining portions of the specification and the attached drawings.

DETAILED DESCRIPTION OF THE INVENTION

Figure 1:
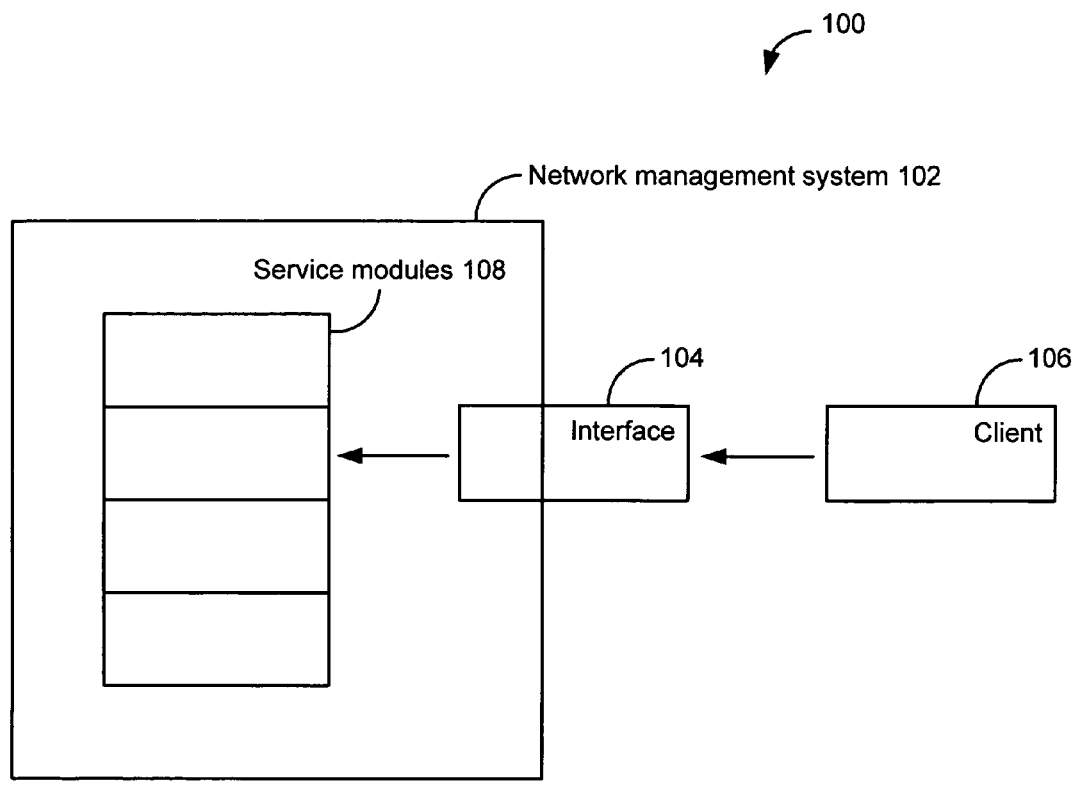
FIG. 1 depicts a system for providing an interface to a network management system.

FIG. 1 depicts a system 100 for providing an interface to a network management system 102. System 100 includes network management system 102, an interface 104, and one or more clients 106.

Network management system 102 is configured to manage network elements of a telecommunication system. For example, network elements include broadband service creation platforms that provide ATM, IP, BRAS functionality and narrowband systems. Although network management system 102 is described, it will be understood that network management system 102 may be any system that is configured to receive commands to perform services in a specific language. For example, billing systems, information management systems, etc. may be used.

Network management system 102 includes one or more service modules 108. Service modules 108 are configured to perform services. A service may be any kind of action that is performed by network management system 102. For example, service modules 108 may provide fault management services, configuration services, performance services, security services, and other network management services.

Service modules 108 may include methods or objects that are used to perform services. A method may be modules of software code that are configured to perform a specific service. In one example, a service module 108 may be fault management and a method within the service may be "get all faults". The get all faults method may retrieve all faults that are associated with certain network elements. Also, the get all faults method may require different parameters. For example, parameters may indicate faults or network elements for which to get the faults.

Interface 104 is configured to communicate commands received from client 106 to network management system 102. In order to invoke services provided by service modules 108, commands should be sent to network management system 102 in a first language. The first language may be specific to network management system 102. For example, the language remote method invocation (RMI) may be used to write services modules 108. This language may not be widely known to users of clients 104. Accordingly, interface 104 is provided to receive commands in a second language different from the first language. The second language is typically well known to users and compatible with most clients 106.

Client 106 may be any computing device configured to communicate with interface 104. For example, client 106 may be a personal computer, workstation, etc. Client 106 may be connected through a network, such as the Internet, to interface 104. For example, communications may be sent using hypertext transfer protocol (HTTP), etc.

Conventionally, client 106 required client side libraries in order to request services from network management system 102. However, using interface 104, client 106 can have services executed by network management system 104 without using client side libraries. Also, client 106 may send service commands in a language other than the first language specific to network management system 102.

In one embodiment, as mentioned above, client 106 does not include client side libraries. The libraries are typically called by commands sent by client 106 and required to communicate commands to network management system 102. However, client 106 is configured to send commands to interface 104 in a second language that is different from the first language. In one embodiment, the second language is a generic language that allows many different clients 106 to communicate with interface 104. For example, an extensible markup language (XML) over hypertext transfer protocol may be used to send commands to interface 104. A person skilled in the art will appreciate other languages that may be used, such as hypertext transfer markup language (HTML), etc. By understanding a generic language, a standardized and flexible interface 104 that is compatible with many different computing devices is provided.

A mapping file may be used to generate commands to send to interface 104. For example, the mapping file lists commands that can be used. The commands are in the form of a general syntax that may be used when sending the commands. The general syntax allows interface 104 to capture command information in a text form, i.e., xml form. In one embodiment, the general syntax follows a data type definition (DTD) model to define all valid syntax. The definition is a collection of declarations that, as a collection, defines valid structure, elements, and attributes that are available for use in a command specification that complies with the general syntax. The general syntax enables interface 104 to parse all commands uniformly. For example, if two commands are requesting two different methods, interface 104 can parse the commands to determine the name of the methods. Interface 104 does not have to recognize what the method is but just can parse the command to determine the names of both methods. Accordingly, different names of methods may be included in commands in the same general syntax and can be parsed by interface 104.

A user can refer to the mapping file in order to generate commands in the form of the second language. A file including the commands may then be sent to interface 104. In one embodiment, libraries at the client side are not necessary in order to send commands to interface 104.

Figure 2:
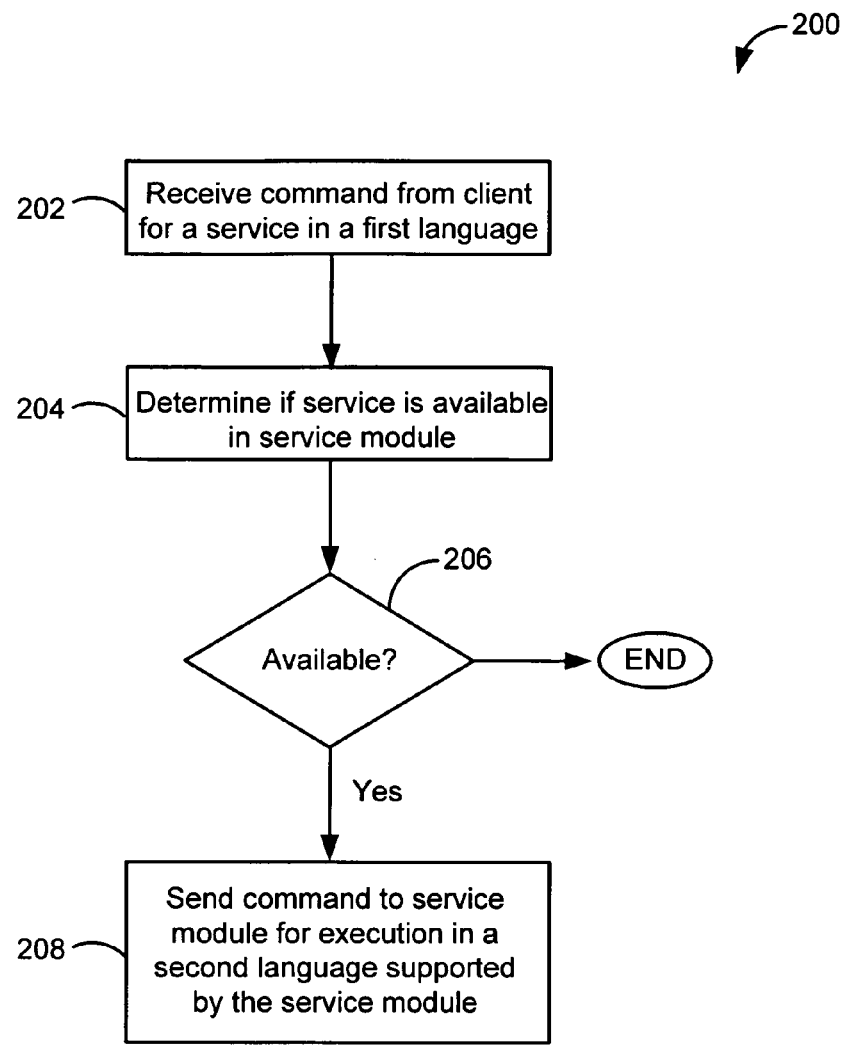
FIG. 2 depicts a simplified flowchart of a method for processing commands from a client 106 according to one embodiment of the present invention.

FIG. 2 depicts a simplified flowchart 200 of a method for processing commands from a client 106 according to one embodiment of the present invention. In one embodiment, it is assumed that a network management system 102 is configured to process commands in a first language.

In step 202, a command in a second language is received from client 106. The command may specify a service that is desired. The second language may be a language that is generally known, such as XML, HTTP. Also, in one embodiment, the second language is different from the first language.

The command may include descriptors. The descriptors are used by interface 104 to determine a command in the first language to send to modules 108. In one embodiment, the descriptors specify a protocol, service, method, and parameters, and will be described in more detail below.

In step 204, interface 104 determines if the service is available in one or more service modules 108. In one embodiment, interface 104 sends an RMI command to modules 108. Interface 104 may not understand exactly what the service the command is requesting, however, interface 104 can parse a command to determine the above descriptors. The descriptors are then used to generate a command for modules 108.

In determining if the service is available, interface 104 determines a protocol to use from the protocol descriptor. Then, a service requested is determined from the service descriptor. Interface 104 generates a command in the protocol that asks if modules 108 support the service requested in the service descriptor. In one embodiment, an RMI command is sent in which one or more service modules 108 can respond indicating whether or not a service is available.

In step 206, if a service is not available, the process ends. In one embodiment, interface 104 may send a message to client 106 indicating that the service requested is not available.

In step 208, if the service is available, a command is sent to a service module 108 for execution. The command may be sent in a first language that is supported by network management system 102. For example, the command may be in a language or protocol specified by the protocol descriptor. Also, the command may be a method call that takes parameters specified by the command. Modules 108 can then execute the command.

In executing the command, modules 108 may call a library that is related to the method. The execution of the command happens within the context of service module 108, which makes the execution transparent to whole system 102 as if it was invoked by one of its service modules.

Accordingly, the command received in step 202 is in a generic format and the method call in addition to the parameters may be parsed out and created in a command that is sent to service module 108 in the applicable protocol.

Figure 3:
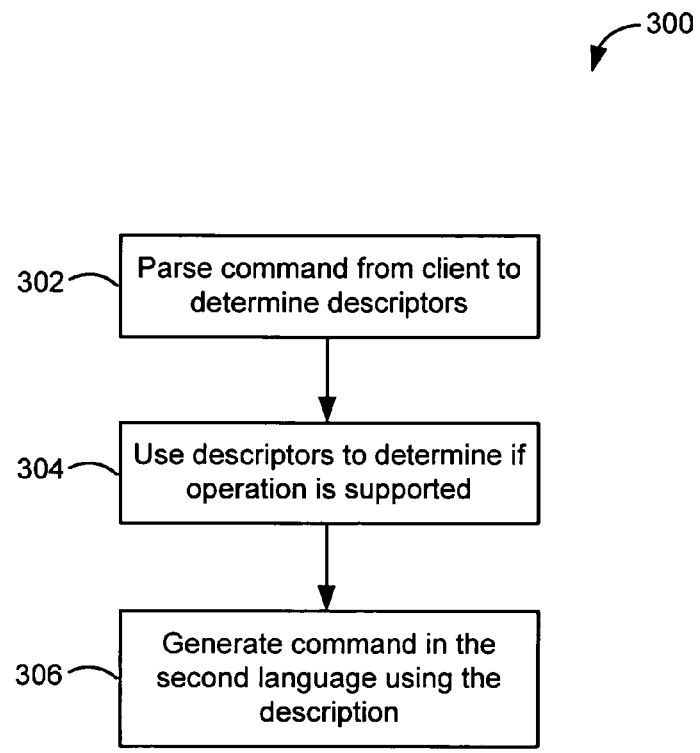
FIG. 3 depicts a simplified flowchart of a method for generating a command in a second language according to one embodiment of the present invention.

FIG. 3 depicts a simplified flowchart 300 of a method for generating a command in the first language specific to network management system 102 according to one embodiment of the present invention. In step 302, a command received from client 106 is parsed to determine descriptors. As mentioned above, descriptors may include any information. For example, a protocol, service, method, and content descriptors may be specified.

A protocol descriptor specifies a protocol to be used to look up the service. For example, any available remote technology that supports run time type information or reflection of objects at run time may be used. Run time type information or reflection of objects at run time is used to determine if an object is available when a command is received. Thus, at run time, interface 104 can determine if a service is available.

A service descriptor specifies a service to be looked up for the operation. The services may be grouped in categories. For example, categories may be faults, performance, configuration, security, and other services.

The method descriptor specifies the operation to be invoked within the service. For example, the method descriptor may be an object to be called for the service.

The content descriptor specifies any parameters for the method descriptor that should be used in a command for modules 108. For example, the parameters may be which network elements the method should be called for.

In step 304, the descriptors are used to determine if a service is supported. For example, a request is sent in the protocol specified by the protocol descriptor asking if the service specified by the service descriptor is supported by service modules 108. The response to the request indicates whether or not the service is supported or not. For example, if a fault service is specified, service modules 108 receive the command and determine if fault service is available.

In step 306, if the service is available, a command is generated in a second language using the descriptors. For example, the method descriptor is used to generate a command for the method specified. Also, any parameters specified by the parameter descriptor may be used in generating the command. For example, a service of "get all faults" method for a specific network element is generated as a command in the first language.

The command received in the second language is in a generic syntax that is understood by interface 104. Interface 104 may generate the command in the first language by parsing certain descriptors from the command. Accordingly, because the generic syntax is used, interface 104 does not need knowledge of any libraries or objects that are required to run the service. By being configured to send commands that are formed from descriptors received in a first command, interface 104 is able to handle any commands received from interface 106.

The coordination of the syntax of commands that are supported by modules 108 is provided to a user or application in a mapping file. A user or application can then generate commands using the syntax of commands in the mapping file. Commands in the correct syntax can be interpreted by interface 104, which can then generate commands in the first language for modules 108.

Figure 4:
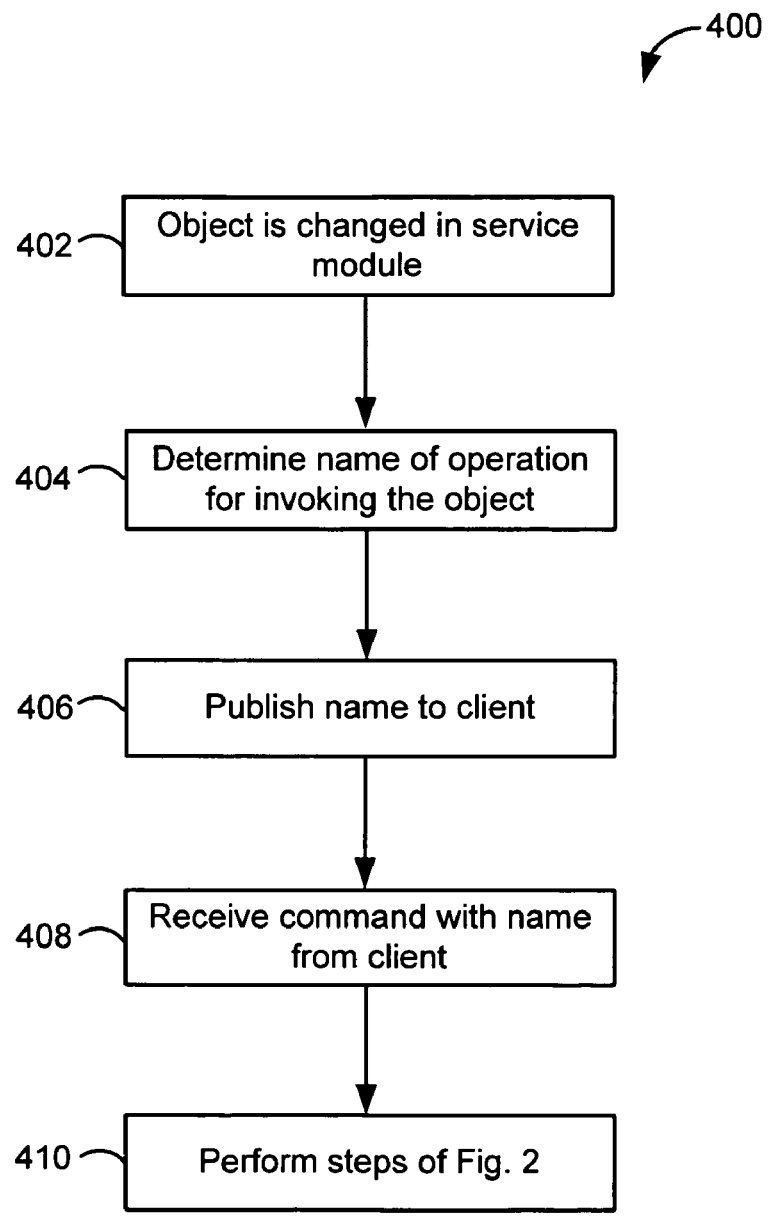
FIG. 4 depicts a simplified flowchart of a method for processing requests when services are changed in service modules according to one embodiment of the present invention.

FIG. 4 depicts a simplified flowchart 400 of a method for processing requests when services are changed in service modules 108 according to one embodiment of the present invention. In step 402, a service module 108 may be changed. For example, services may be added or existing services may be updated in a service module 108. Service module 108 may be changed by changing or adding a method.

In step 402, a name of a method for invoking the service changed or updated in step 402 is determined. For example, an administrator may determine a name that should be used to invoke the method. For example, a method call may be determined.

In step 406, the name is published to a client 106. For example, a text file may be sent to a user of client 106. The user may then use the general syntax of the name in order to invoke the service. Libraries do not need to be installed or changed in order for client 106 to request the new service.

The name that is published includes the name of the service, name of the method, and possible parameters. The name is a general syntax that should be used if the service is requested. In one embodiment, libraries are not published to client 106. Accordingly, when a change to a service module 108 is made, interface 104 and client 106 may not need to be changed (e.g., they do not need new libraries installed). Rather, a text file with the name of the command to be used is published.

In step 408, a request is received from client 106. The request may be in the general syntax of the command that is published to the client 106. Because the general syntax is used, interface 104 understands the general syntax and can parse the command in order to determine if the service is supported. If the service is supported, then the service can be requested.

In step 410, steps 202-208 are then performed as described in FIG. 2 in order to request a service.

Accordingly, changes are not needed at interface 104 when services are changed or updated. Because a generic syntax is used to send commands for various services from client 106, interface 104 needs to know how to parse commands received in the second language from client 106. If the new services are supported by service modules 108, interface 104 communicates with service modules 108 in order to determine if the services are supported. If they are, then interface 104 can then send the command in the first language for the service as requested from the command received from client 106.

Also, services may be changed in service modules 108 without having to change client 106. The name or general syntax for a command of the service that has changed is published to client 106. Accordingly, a user sending commands to interface 104 needs to know the name of the command, but client 106 does not need any other information. Thus, any client 106 may be used to generate an XML file with the names of the commands that are published.

Using system 100, the following command in the second language may be sent from client 106. In one embodiment, the following command may be used by an operational support system (OSS) application (which manages a specific portion of a network) of an element/network management system 102 via interface 104. The command may be used to create/provision ATM traffic descriptors to be used in ATM channels. In one embodiment, the following command is written in an XML language. XML is a human-readable off the shelf language in which XML programs may be created using parsers that are generally available. Thus, users may write scripts or web interfaces to invoke a service using any client 106. Section I discloses an example of an XML command for the above service.

---

Service descriptor
    <serviceName>Profile</serviceName>
Method descriptor:
    <methodName>provisionProfile</methodName>
Parameter descriptor:
    <params>
        <paramValue xsi:type="java:MapWrapper">
            <entry>
                <key>type</key>
                <value>TrafficDescriptor</value>
            </entry>
            <entry>
                <key>creationTime</key>
                <value xsi:type="java.lang.Long">1065633669483</value>
            </entry>
            <entry>
                <key>atmTrafficDescrParamIndex</key>
                <value xsi:type="java.lang.Integer">23</value>
            </entry>
            <entry>
                <key>atmTrafficDescrParam1</key>
                <value xsi:type="java.lang.Integer">100</value>
            </entry>
            ...
            <entry>
                <key>atmTrafficDescrParam5</key>
                <value xsi:type="java.lang.Integer">0</value>

```
        </entry>
        <entry>
            <key>atmServiceCategory</key>
            <value xsi:type="java.lang.Integer">3</value>
        </entry>
    </paramValue>
    <paramType>
        <type>ProfileDetails</type>
        <exactType></exactType>
    </paramType>
</params>
```

The service descriptor section specifies the service module to look for within system 102. In this case, it is a Profile service. The method descriptor section specifies the method to be executed on the above specified service. In this case, it is a provisioning of an ATM Traffic descriptor method. The parameter descriptor section captures parameters related information needed at the time of execution of above specified method. Within parameter descriptor, each parameter of a method call is captured in its params block. The param block contains information related to the parameter type and its contents.

As network equipment in a network changes or new parameters or services get introduced for a managed object, new services may be added or changed. The changed or new services may be added to a client request without affecting client 106 or interface 104. Also, an application may automatically add the commands for the new services if users do not want to configure newly introduced or updated services to pre-existing code. For example, the text of an XML file including commands may be modified to reflect upgrades to services in service modules 108. For example, if a new attribute "ATM Traffic Frame Discard" is introduced for the creation of traffic descriptors, then clients 104 may add the following entry for this update:

```
<entry>
    <key>atmTrafficFrameDiscard</key>
    <value xsi:type="java.lang.Boolean">true</value>
</entry>
...
</paramValue>
</paramType>
```

The above entry is needed in order to invoke the newly added service. No changes to interface 104 and client 106 are thus processed. The name "ATM Traffic Frame Discard" is published to a user of client 106. The command may be generated using a generic syntax that should be followed when sending commands from client 106 interface 104.

Embodiments of the present invention provide many advantages. For example, services may be frequently added or changed in a network element management system 102. When these services are added or changed, changes to interface 104 and client 106 may not be necessary. Rather, the name of a command that should be used by client 106 is published. A user of client 106 may then use this name in order to request the service in a command using a generic syntax. Accordingly, new services may be easily added to service modules 108 without changing interface 104 or client 106.

The present invention can be implemented in the form of control logic in software or hardware or a combination of both. The logic may be stored on an information storage medium as a plurality of instructions adapted to direct an information processing device to perform a set of steps disclosed by embodiments of the present invention. Based on the disclosure and teachings provided herein, a person of ordinary skill in the art will appreciate other ways and/or methods to implement the present invention.

The above description is illustrative but not restrictive. Many variations of the invention will become apparent to those skilled in the art upon review of the disclosure. The scope of the invention should, therefore, be determined not with reference to the above description, but instead should be determined with reference to the pending claims along with their full scope or equivalents.

What is claimed is:

1. A method for executing commands with a hardware processor in a network management device including one or more service modules, the method comprising:
    providing a network interface of the network management device configured to receive commands for services from a client, the interface configured to process commands in a generic syntax;
    receiving a command specifying a service from the client at the interface of the network management device, the command in a first language and following the generic syntax of the interface;
    parsing the command at the network management device to obtain one or more descriptors;
    determining the availability of the service at the network management device based on the one or more descriptors;
    generating an internal command in a second language and executing the internal command at the network management device if it is determined that the service is available; and
    sending a message to the client and discontinuing processing of the command if it is determined that the service is not available.

2. The method of claim 1, further comprising changing the availability of a service at the network management device.

3. The method of claim 2, wherein changing the availability of the service is done absent a change to the generic syntax of the interface.

4. The method of claim 2, further comprising:
    receiving a command for the changed service at the interface from the client;
    parsing the command to obtain one or more descriptors corresponding to the changed service;
    determining if the changed service is available at the network management device; and
    generating an internal command for the changed service in the second language and executing the internal command at the network management device if it is determined that the changed service is available.

5. The method of claim 2, further comprising publishing a name for the changed service to the client, and wherein the command received at the interface comprises the name of the changed service.

6. The method of claim 5, wherein the published name is included in a text file.

7. The method of claim 1, wherein the client does not include a library associated with the one or more service modules.

8. The method of claim 1, wherein the first language comprises XML.

9. The method of claim 1, wherein the second language comprises a language specific to the network management device.

10. The method of claim 1, wherein the one or more descriptors comprise a protocol descriptor that indicates a protocol that the interface should use to send the command.

11. The method of claim 10, wherein the one or more descriptors comprise a service descriptor indicating a service to be performed by the one or more service modules.

12. The method of claim 10, wherein the one or more descriptors comprise a method descriptor indicating a method of the service to be performed by one or more service modules.

13. The method of claim 12, wherein the one or more descriptors comprise a parameter descriptor indicating one or more parameters to specify with the method.

14. A network management device comprising a hardware processor configured to:
   receive commands for services having a generic syntax and to process the commands at the network management device in accordance with the generic syntax;
   receive a command specifying a service from a first client at the interface, the command in a first language and comprising the generic syntax of the interface;
   parse the command to obtain one or more descriptors;
   determine the availability of the service at the network management device based on the one or more descriptors;
   generate an internal command in a second language and to execute the internal command at the network management device if it is determined that the service is available; and
   send a message to the first client and discontinue processing of the command if it is determined that the service is not available.

15. The network management device of claim 14, wherein the hardware processor is configured to change the availability of a service at the network device.

16. The network management device of claim 15, wherein changing the availability of the server is done absent a change to the generic syntax.

17. The network management device of claim 15, wherein the hardware processor is configured to:
   receive a command for the changed service at the interface from a client;
   parse the command to obtain one or more descriptors corresponding to the changed service;
   determine if the changed service is available at the network management device; and
   generate an internal command for the changed service in the second language and executing the internal command at the network management device if it is determined that the changed service is available.

18. The network management device of claim 15, wherein the hardware processor is configured to publish a name for the changed service to the client, and wherein the command received at the interface comprises the name of the changed service.

19. The network management device of claim 18, wherein the published name is included in a text file.

20. The network management device of claim 14, wherein the first client does not include a library associated with the one or more service modules.

21. The network management device of claim 14, wherein the first language comprises XML.

22. The network management device of claim 14, wherein the second language comprises a language specific to the network management device.

23. The network management device of claim 14, wherein the one or more descriptors comprise a protocol descriptor that indicates a protocol that the interface should use to send the command.

24. The network management device of claim 23, wherein the one or more descriptors comprise a service descriptor indicating a service to be performed by the one or more service modules.

25. The network management device of claim 23, wherein the one or more descriptors comprise a method descriptor indicating a method of the service to be performed by one or more service modules.

26. The network management device of claim 25, wherein the one or more descriptors comprise a parameter descriptor indicating one or more parameters to specify with the method.

* * * * *